(12) United States Patent
Menne (10) Patent No.: US 8,226,036 B2
(45) Date of Patent: Jul. 24, 2012

(54) ECU MOUNTING SYSTEM FOR A LIGHT AIRCRAFT

(75) Inventor: Chad W. Menne, Blaine, MN (US)

(73) Assignee: Malibu Aerospace, Blaine, MN (US)

( * ) Notice: Subject to any disclaimer, the term of this patent is extended or adjusted under 35 U.S.C. 154(b) by 312 days.

(21) Appl. No.: 12/577,976

(22) Filed: Oct. 13, 2009

(65) Prior Publication Data

US 2011/0084169 A1    Apr. 14, 2011

(51) Int. Cl.
*B64C 1/00* (2006.01)

(52) U.S. Cl. ..................................... 244/129.1; 244/121

(58) Field of Classification Search ............... 244/118.1, 244/119, 121, 129.1, 129.2
See application file for complete search history.

(56) References Cited

PUBLICATIONS

Robert Bonev; Press Release; Aug. 19, 1999; Continental Motors; n.p.*
"Full Authority Digital Engine Controls"—Powerpoint; No Date, Teledyne Continental Motors; Slides 3 and 7.*
Teledyne Continental Motors; May 31, 2009; <http://genuinecontinental.aero/>.*
* cited by examiner

*Primary Examiner* — Timothy D Collins
*Assistant Examiner* — Michael A Fabula
(74) *Attorney, Agent, or Firm* — Knoble Yoshida & Dunleavy, LLC (57) ABSTRACT

A system and method for mounting engine control units. The engine control unit (ECU) mounting system is placed within a compartment of the light aircraft, aft of the firewall. The ECU mounting system uses a bracket that holds the electrical control units. The electrical control units are mounted through a firewall and are accessible via the adjacent compartment.

20 Claims, 10 Drawing Sheets

ECU MOUNTING SYSTEM FOR A LIGHT AIRCRAFT

BACKGROUND OF THE INVENTION

1. Field of the Invention

The present invention is directed to the field of aircraft. In particular the present invention is directed to an Electronic Control Unit (ECU) mounting system.

2. Description of the Related Technology

The Piper PA-46 Malibu and Mirage aircraft are light aircraft that are powered by a single engine and typically have the capacity for one pilot and five passengers. While these types of planes have good overall performance there is ample room to improve safety, power, cruise speed, rate of climb and adjustments between maintenance intervals.

One manner of accomplishing improvement in performance for light aircraft is to provide the integration of a FADEC (Full Authority Digital Engine Control) engine assembly in order to replace the existing power plant in the aircraft. To provide integration of the engine assembly the existing mount needs to be improved as well as the mounting of the ECUs. Improved safety for the light aircraft may also be achieved through the usage of an improved Electronic Control Unit mounting system via placement of the ECUs in an easily accessible area.

Since FADEC control for light aircraft is a new technology, there is a need in the field for a new ECU mounting system for light aircraft that is able to accommodate easily accessible placement of the ECU units that will also protect them from temperature extremes.

SUMMARY OF THE INVENTION

An object of the present invention is an electrical control unit installed within a compartment of a light aircraft.

Another object of the present invention is an electrical control unit mounting system providing easy access within a light aircraft.

Still yet another object of the present invention is a method for installing an electrical control unit bracket in light aircraft.

An aspect of the present invention may be an electrical control unit mounting system for use in a light aircraft comprising: a firewall installed in the light aircraft; a compartment located adjacent to the firewall, wherein the compartment is further located adjacent to a compartment cover; a plurality of holes in the firewall; a bracket comprising a plurality of angled brackets, wherein the bracket is mounted to the firewall through the plurality of holes and located within the compartment; and an electrical control unit located on the bracket.

A method for mounting electronic control units in a light aircraft comprising: drilling holes in a firewall; positioning an electrical control unit bracket on the firewall within a compartment; installing an electronic control unit on the bracket and through the firewall; and placing a compartment cover over the bracket compartment.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

The present invention is an ECU mounting system 10 used in conjunction with a new engine mount assembly that permits improvement of the performance of a light aircraft, such as the Piper PA-46 Malibu and Mirage Aircraft. A "light aircraft" is an aircraft having a total gross weight of 12,500 lbs. or less. The improvement of the light aircraft includes the integration and improvement of a FADEC engine assembly to replace the existing power plant in the light aircraft.

Figure 1:
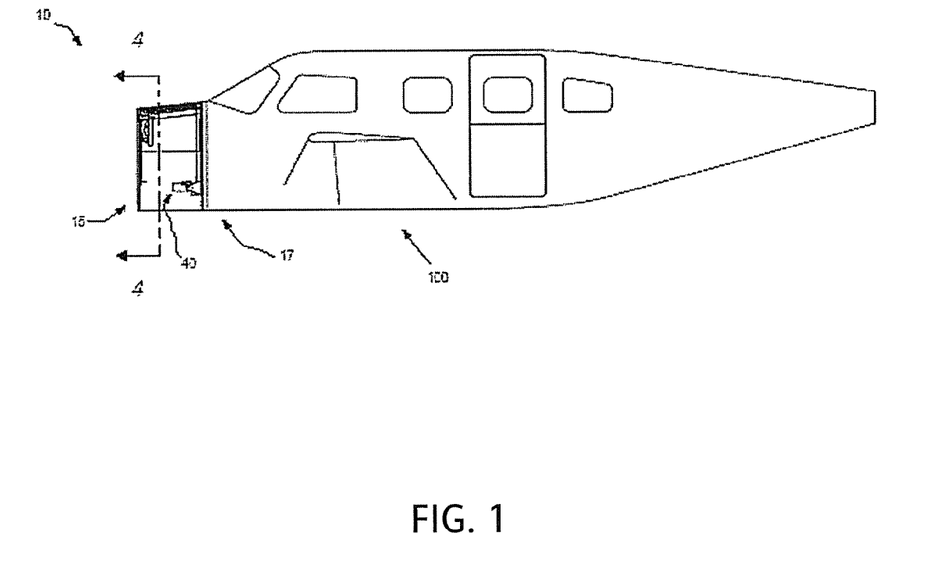
FIG. 1 is a side view of the light aircraft with the ECU mounting system installed.

A FADEC engine is remounted into the airframe of the light aircraft 100. A view of the aircraft 100 is shown in FIG. 1. The FADEC engine is remounted with the ECU mounting system 10 while also using an improved engine mount assembly. Also used in the improvement of the performance of the light aircraft 100 mounting are various wiring harnesses and accessories, electronic control units (ECU) 24, a three bladed composite propeller, such as a Hartzell Composite Propeller and other devices so as to significantly improve the performance of the aircraft 100.

More specifically, the new engine power plant may be built up around an existing 550 cubic inch piston engine, such as the Teledyne Continental 550 cubic inch piston engine produced by Teledyne Continental Motors. The electronic management of various systems has been improved so as to accommodate a high altitude FADEC application. Furthermore, new algorithms to allocate fuel at various altitudes and power settings leads to significant improvement in the power plant. Additionally, larger, more efficient turbo chargers may be used in the aircraft 100, thereby raising the critical altitude of the modified aircraft 100 to exceed that of the original aircraft.

The serial bus controller may also be improved to output both analog as well as digital information in order to support various engine gauges and other electronic equipment collateral to the FADEC installation and to accept sensory data from various sensors embedded in the FADEC installation for purposes of data collection, recording and long term maintenance analysis.

Furthermore, new algorithms to allocate fuel at various altitudes and power settings additionally lead to significant improvement in the power plant. Larger, more efficient turbo chargers have also been applied based on Malibu Aerospace research. Thus raising the critical altitude of the modified aircraft 100 to exceed the original aircraft.

Current light aircraft of the aforementioned type do not have the features discussed above and the new and improved aircraft will be will be substantially safer to fly, more powerful, cruise faster, climb at a higher rate and require fewer adjustments between maintenance intervals. These efforts include the improvement and integration of a FADEC (Full Authority Digital Engine Control) engine assembly to replace the existing power plant in the PA46 aircraft.

The engine mount assembly that accommodates the engine incorporates significant finite element analysis (FEA) engineering. The engine mount assembly of the present invention is substantially stronger than existing engine mounts. Previous mounts were prone to cracks in critical areas, so the tube wall thickness in these areas have been increased for better weld penetration and the nose landing gear actuator attach point, which has been particularly troublesome, has been changed to a one-piece machined boss to greatly improve strength and stability in that area. The improved strength improves the safety and longevity of the existing aircraft by greatly reducing fatigue stress.

The engine mount assembly may include a 2° rotational off-set of the engine location in order to compensate for the extra power and torque created by the more powerful power plant without creating adverse yaw during steep climb angles. The offset angle vectors just enough thrust laterally to compensate for the torque, gyroscopic forces and slip stream effects of an aircraft, thus allowing for better aircraft control at maximum power and minimum speed, while sacrificing minimal thrust for high speed operations. This is provided for by the mounting of the FADEC engine installation.

The electronic control units 24 for the FADEC are heat sensitive and must be located in the optimum location. The solution for the light aircraft 100 embodies a series of precision drilled holes 7 in the firewall 15 adjacent to the engine exposing an area behind the firewall 15 in the compartment 40 with a specially designed ECU bracket 22 which mounts the electronic control units 24 with their posts 23, which may be high tension spark towers or other electrical or mechanical connections protruding through the holes in the firewall 15. Thus producing the best of both worlds for the electronic controls. That is to say, a temperature controlled environment for the electronics, still in close proximity to the engine for control.

The unique and novel design aspects of the ECU mounting system 10 is the provision of electronic control units 24 for the FADEC by in installing a computer in a heat and flame protected area, while maintaining access to the posts 23, i.e. spark towers, for engine operation and further incorporating a standard aircraft firewall bulkhead fitting flameproof arrangement to withstand 2000° F. for 15 minutes as required by FAA regulations. The structural design used to install the ECUs 24 is also done in such a way that it minimizes the space used for the installation, as well as distributes the loads into the firewall 15 almost entirely in shear due to the overhead support at the rear of the ECU mounting system, which is an important factor for firewall structural characteristics.

The ECU mounting system 10 and method of mounting the ECU mounting system 10 via the penetration of the strategic firewall 15 used with the light aircraft 100. In the embodiment shown herein, the light aircraft 100 may be a Malibu Aerospace PA46 and the installation may be a retrofit of an existing light aircraft.

In the embodiment shown in the FIGURES, the FADEC engine as installed in the light aircraft 100 no longer utilizes magnetos as was the case with the original engine. Instead, it uses electronic control modules 24 associated with the FADEC system. While it is recognized that electronic control modules 24, capacitance discharge systems, and impulse injectors have been utilized on other engines, specifically in the automotive industry and some other aircraft, installation on light aircraft 100 and in particular the PA46 Malibu airframe have not been used. Furthermore, this is the first time the FADEC computers have been mounted to the aft side of the firewall 15 while maintaining flame protection.

Coupled to the engine is a three-bladed composite propeller. This propeller may have nickel, stainless embedded leading edges and a modified three blade electrical de-ice system to accommodate the PA46 aircraft. All of the various engineering required to assemble these various components into the aircraft are unique to the PA46 modification.

The advantages of the new ECU mounting system 10 are as follows. Mounting the ECUs 24 in the baggage compartment 40 of the aircraft 100 provides a clean and cool environment for the processors found within the ECUs 24. The simple manner of the structure used provides stability to the ECUs 24 while maintaining the integrity of the firewall 15. The ECU mounting system 10 provides easy access to the computers through the compartment 40. Additional space benefits the ECUs 24 without much sacrifice to the storage space within the compartment 40.

Now turning to the drawings, wherein an embodiment of the present invention is shown and referring now to FIG. 1. FIG. 1 is a side view of the light aircraft 100 with the ECU mounting system 10 installed in the front portion of the aircraft 100. The ECU mounting system 10 is installed in the compartment 40. The compartment 40 is preferably the baggage compartment 40 found in this type of light aircraft and in particular found within the PA46. As mentioned above, the location of the compartment 40 permits ease of access for the both the installation of the ECU mounting system 10 and the ECUs 24 after installation.

Figure 2:
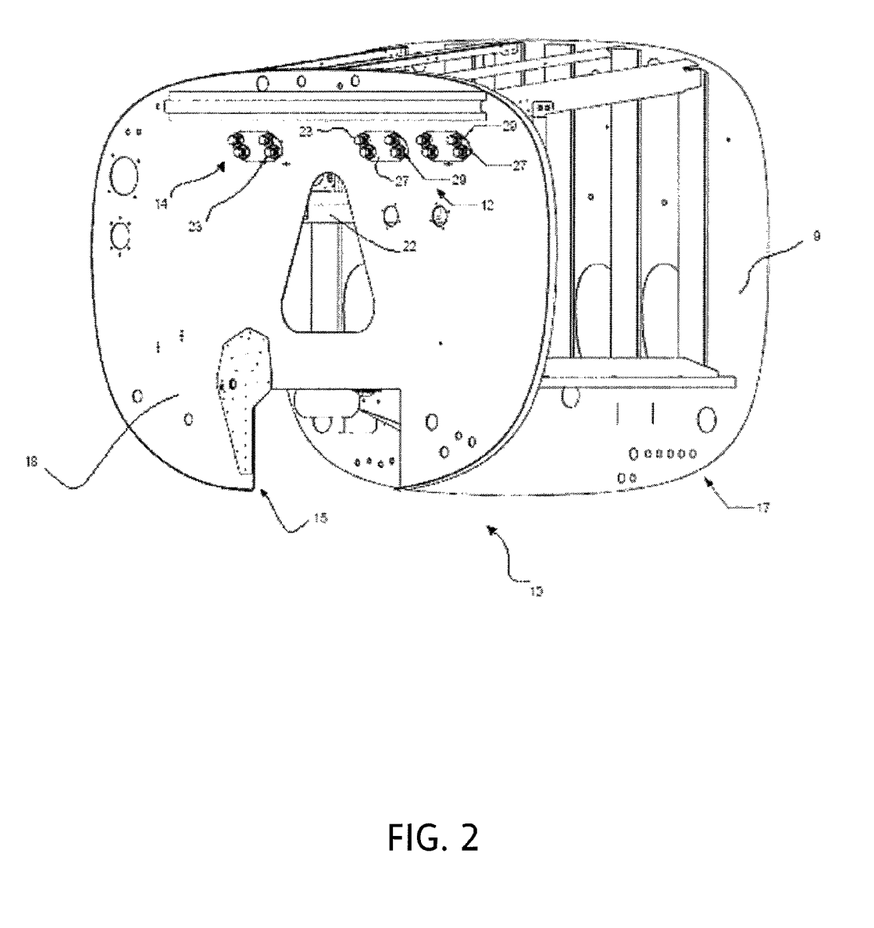
FIG. 2 is a front perspective view of an engine mounting system made in accordance with the present invention.

FIG. 2 is a front perspective view of an ECU mounting system 10 made in accordance with an embodiment of the present invention. The ECU mounting system 10 comprises the ECU bracket 22 placed within the compartment 40 of the light aircraft 100 and attached to the firewall 15 through the usage of four horizontal aligned screws 6 along with four more screws 41, two each on the outer most longerons 32 inside the compartment 40. The firewall 15 is a fireproof (or fire-resistant) wall designed to prevent the spread of fire through the light aircraft 100. The firewall 15 has a forward portion 18 in which the single ECU assembly 14 and the dual ECU assembly 12 are inserted through the firewall 15, but still remain accessible through the compartment 40. Jam nuts 29 are threaded onto the bottom of posts 23 and a quad washer 27 is placed over the posts 23. Posts 23 are then inserted through the firewall 15 and are accessible from the forward portion 18 of the firewall 15, the posts 23 may be spark towers. A quad washer 27 is placed over the posts 23 and jam nuts 29 are threaded on the posts 23 thus sandwiching the firewall 15 between the two quad washers 27. The jam 29 nuts are then tightened to secure the ECU assemblies 12 and 14 in place. The four corners of the quad washers 27 are bent up against the jam nuts 29 to lock them in place, on both the forward 18 and aft 21 side of the firewall 15. Visible through the forward portion 18 is the ECU bracket 22. Also shown is the pressure bulkhead 17 with the forward face 9.

Figure 3:
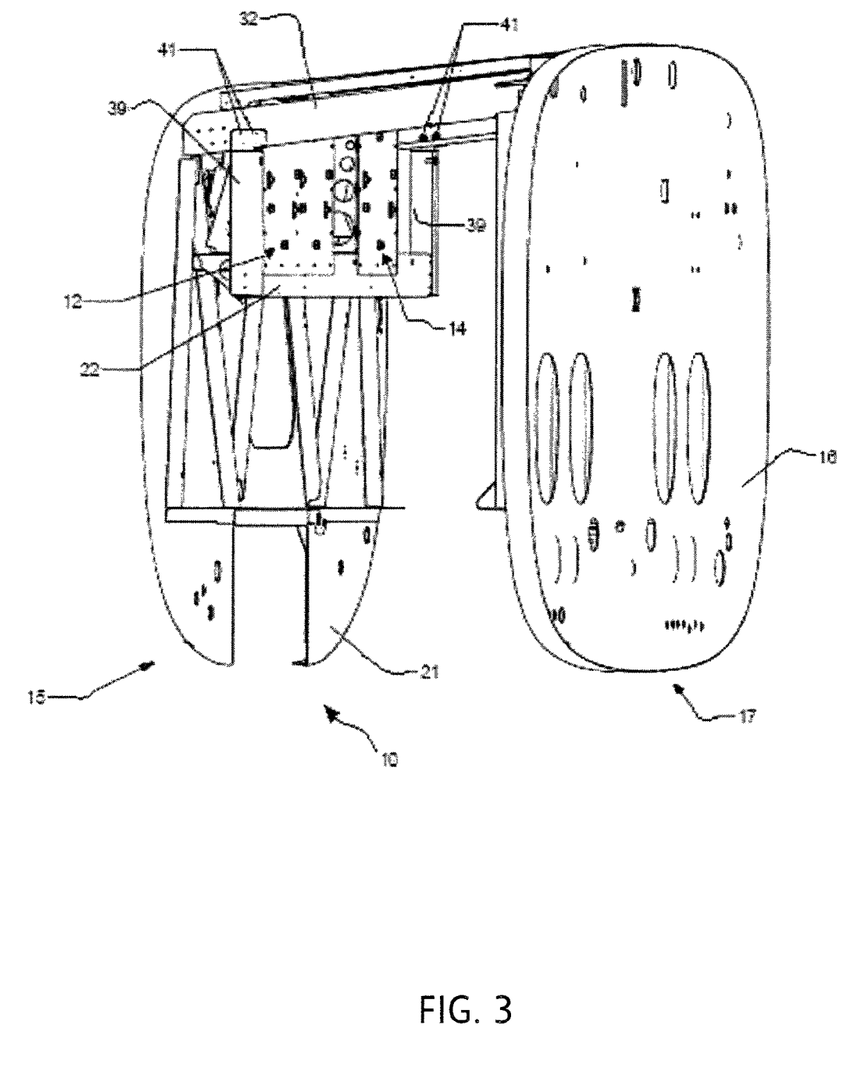
FIG. 3 is a rear perspective view of the ECU mounting system shown in FIG. 2.

FIG. 3 is a rear perspective view of the ECU mounting system 10 shown in FIG. 1. Shown is the rearward portion 21 of the firewall 15 and the rearward cover portion 16 of the pressure bulkhead 17. Also shown in FIG. 3 is the single ECU assembly 14 and dual ECU assembly 12 mounted on the ECU bracket 22 of the ECU mounting assembly 10. The ECUs 24 may be digital computers, processors, microprocessors, or other electronic units that operate to control functions of the engine and/or other operational features of the light aircraft 100. The ECUs 24 may alter functions of the engine based on data received from various sensors and data input mechanisms located within the cockpit, engine or elsewhere on the light aircraft 100.

Figure 4:
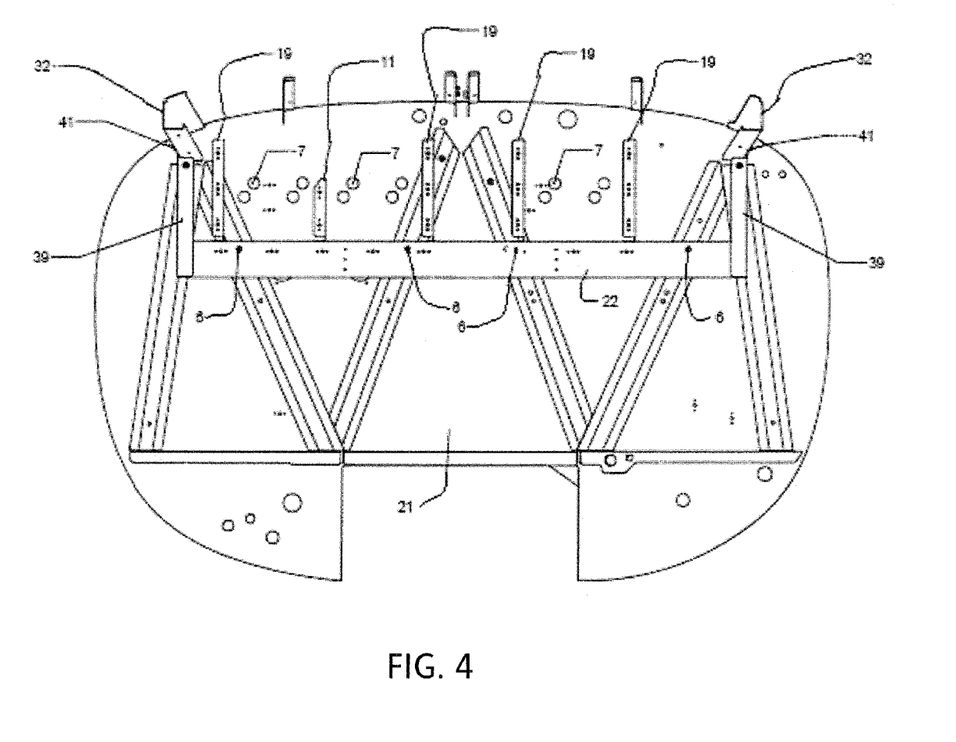
FIG. 4 is rear view of the ECU mounting system taken along the line 4-4 shown in FIG. 1.
Figure 5:
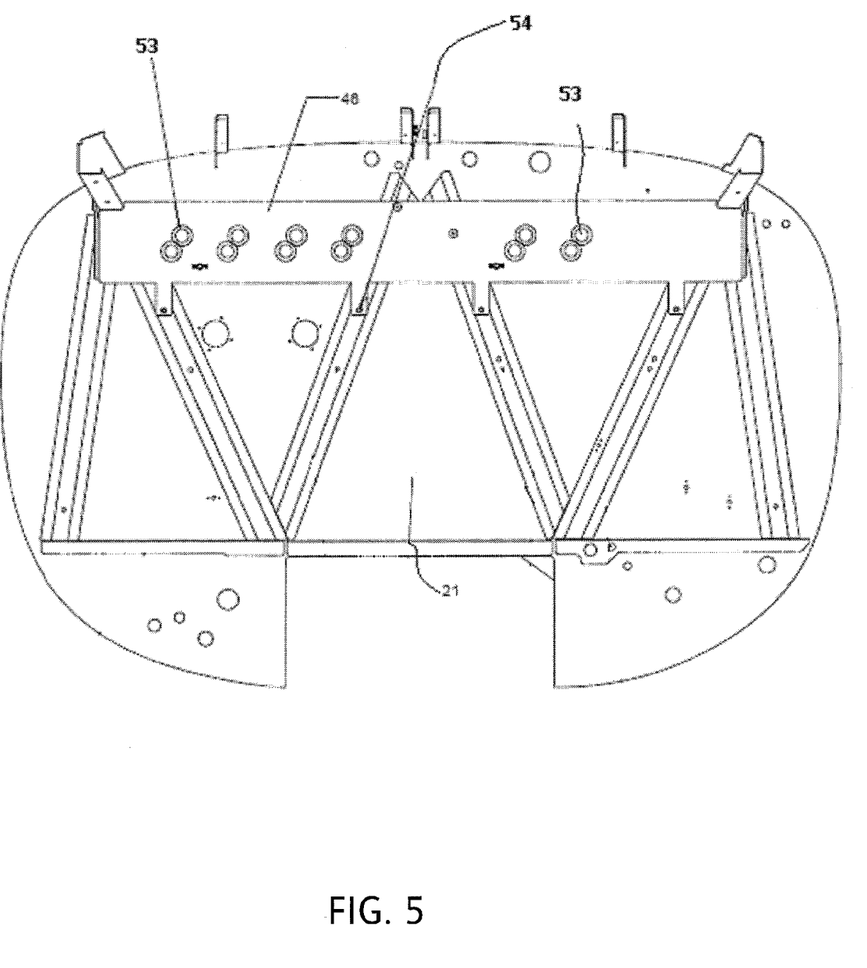
FIG. 5 is a perspective view of the tool used for the ECU mounting system.

FIG. 4 is cross-sectional rear view of the ECU mounting system 10 and rearward portion 21 of the firewall 15 taken along the line 4-4 shown in FIG. 1. FIG. 5 is a perspective view of the ECU mounting system 10 and rearward portion 21. The ECU bracket 22 is mounted to the rearward portion 21 of the firewall 15. The ECU bracket 22 is mounted in location proximate to the location of the holes 7 and extends lengthwise along the surface of the rearward portion 21 of the firewall 15. The ECU bracket 22 is mounted using the four horizontally aligned screws 6 as well as four additional screws 41, two on each side, attaching the vertical brackets 39 of the ECU bracket 22 to the two outer most longerons 32 inside the compartment 40. The holes 7 are for insertion of the posts 23 and may have been previously drilled through the firewall 15. The vertical brackets 39 cooperate with the angled brackets 19 and central angled bracket 11 to displace the ECU bracket 22 from the rearward portion 21 of the firewall 15. The longerons 32 extend from the surface of the rearward portion of the firewall 15 to the forward face 9 of the pressure bulkhead 17. The angled brackets 19 and central angled bracket 11 extend perpendicularly from the surface of the ECU bracket 22. The central angled bracket 11 is smaller in size than the angled brackets 19.

FIG. 5 is a front prospective view of the custom made tool 46 used to locate the holes in the firewall 15 for the spark towers 23 as well as the holes in the hat sections for mounting the ECU shelf 22. The tool is located by centering it horizontally between the two outer longerons 32 and vertically by butting the tool 46 up to the longerons 32. The custom made tool 46 has screw guides 54 for foiming the holes for screws 6 and hole guide 53 for forming the holes 7. The purpose for the tool is to maintain the relationship between the holes 7 for the ECU towers 23 and the holes for the ECU shelf 22.

Figure 6:
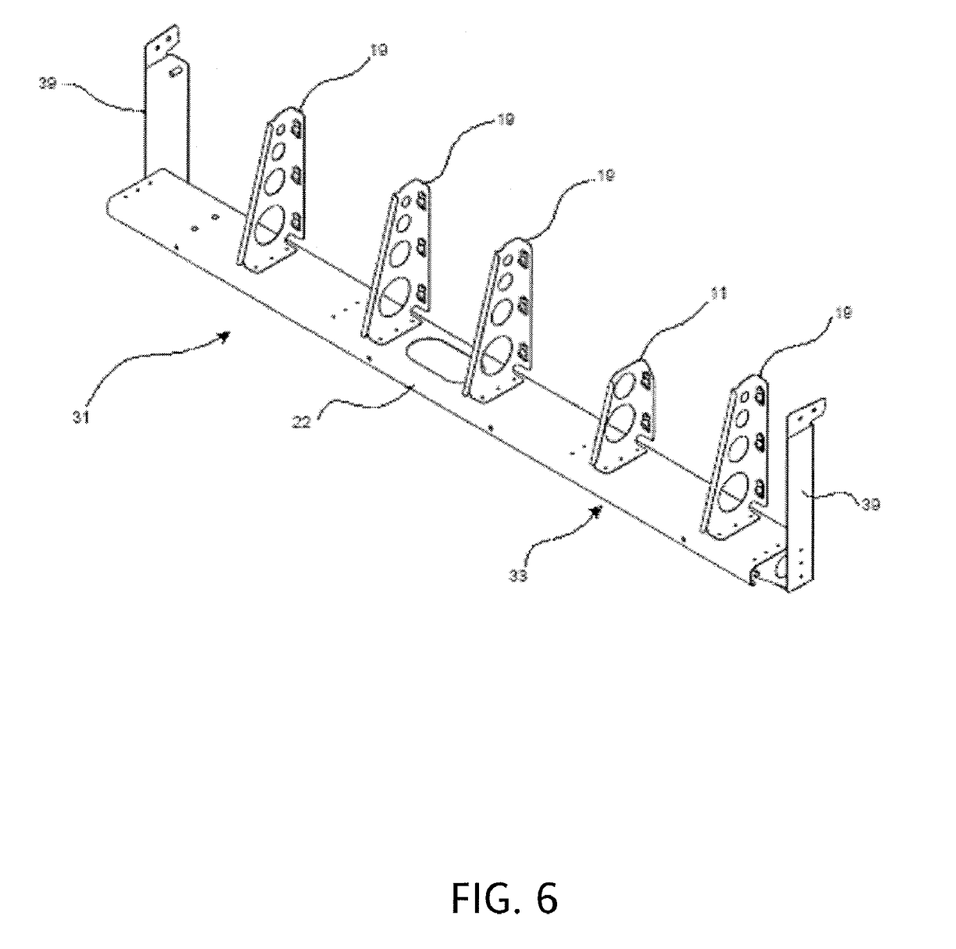
FIG. 6 is a perspective view of an ECU bracket.

FIG. 6 is a front perspective view of the ECU bracket 22. The single ECU assembly 14 and the dual ECU assembly 12 are mounted thereon. The single ECU assembly 14 is mounted in the single mount location 31 formed by the angled brackets 19. The angled brackets 19 will abut the single ECU assembly 14 when it is mounted. It should be understood that the number and arrangement of ECU assemblies 12 and 14 are illustrative only and there may be more or less depending upon the needs of the system and the particular aircraft 100 in which the mounting is occurring.

Located adjacent to the single mount location 31 is dual mount location 33 which is formed by the angled brackets 19 and central angled bracket 11. The dual ECU assembly 12 is mounted within the dual mount location 33.

The ECU bracket 22 is attached to the rearward portion 21 of the firewall 15 and permits mounting of both the single ECU assembly 14 and the dual assembly 12 to be mounted adjacent to the firewall 15. The ECU bracket 22 may be made of a 2024-T3 aluminum and may be electroless nickel plated. The bracket 22 is mounted to the hat sections on the firewall 15 and the outboard longerons 32. The purpose of the ECU bracket 22 is to mount the ECU's 24 while giving electrical continuity. The structural design is such that it will transfer the load from the weight of the ECU's 24 to the firewall 15 in shear. The ECU's 24 and ground straps 25 are assembled to the plates 42 and 43 and then mounted to the ECU bracket 22.

Figure 7:
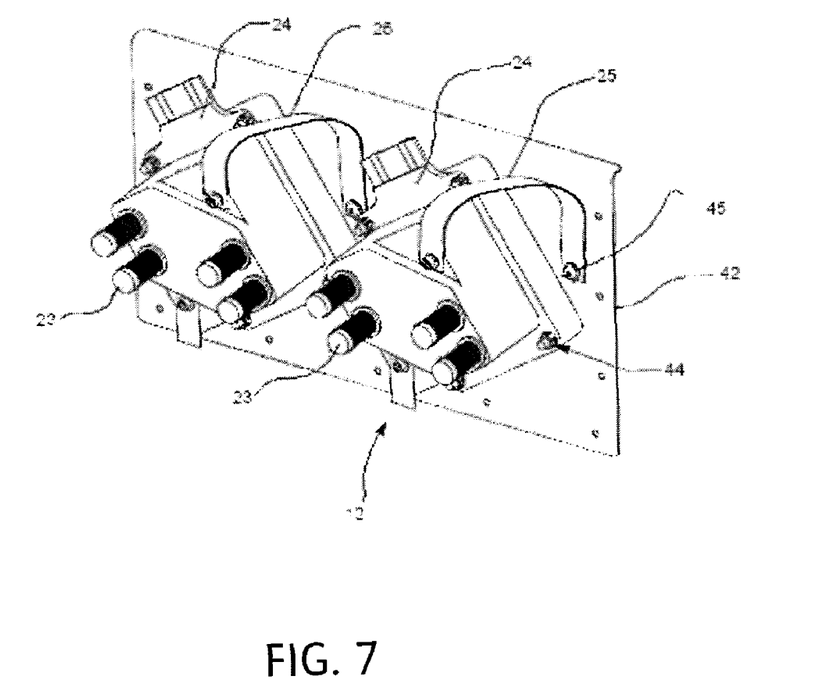
FIG. 7 is a front perspective view of the dual plate assembly.

FIG. 7 is a front perspective view of the dual ECU assembly 12. The ECUs 24 are mounted onto the dual assembly plate 42 through the usage of four AN4-15A bolts 44 per ECU. The four grounding straps 25 are attached to the ECUs 24 using existing hardware on the ECU and to the dual assembly plate 42 using screw 45

Figure 8:
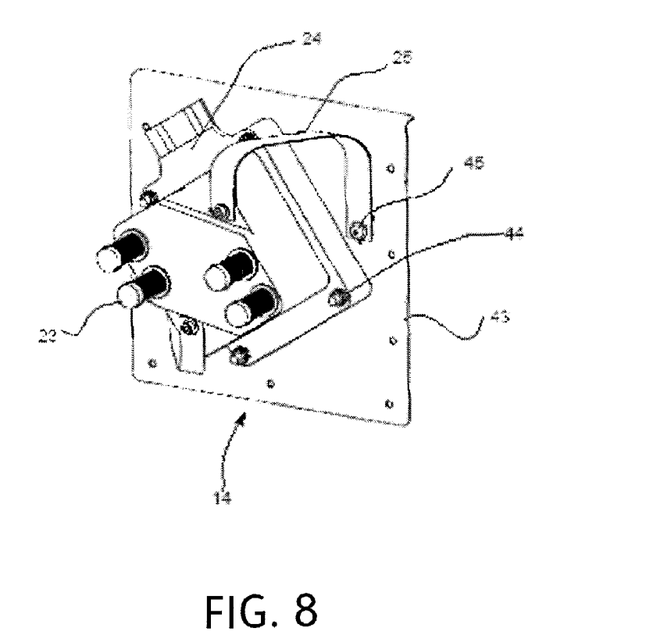
FIG. 8 is a front perspective view of the single plate assembly.

FIG. 8 is a front perspective view of the single ECU assembly 14. The ECUs 24 are mounted onto the single assembly plate 43 through the usage of four AN4-15 bolts 44. The two grounding straps 25 are attached to the ECUs 24 using existing hardware on the ECU and to the single assembly plate 43 using screw 45.

Figure 9:
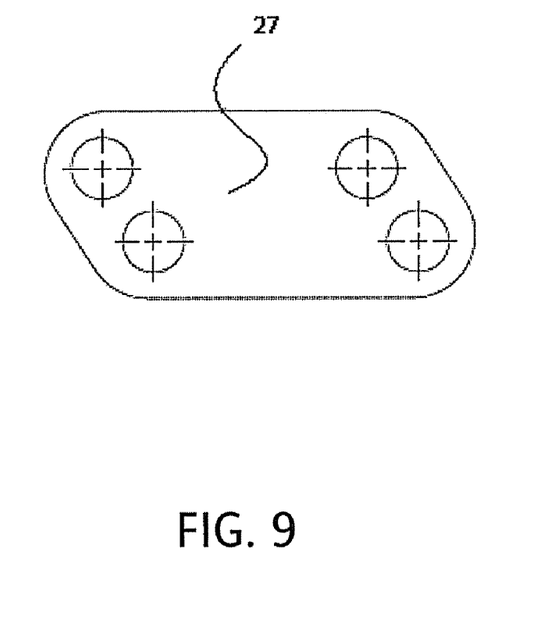
FIG. 9 is a front view of the washer.
Figure 10:
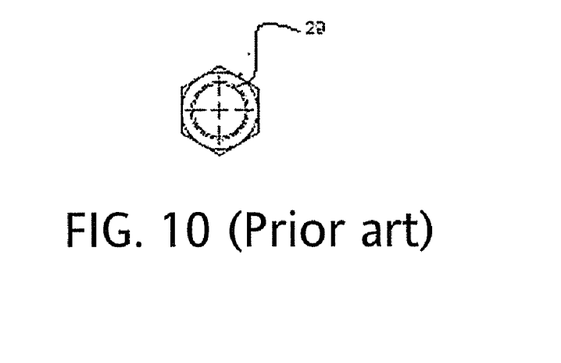
FIG. 10 is a front view of the jam nut.
Figure 11:
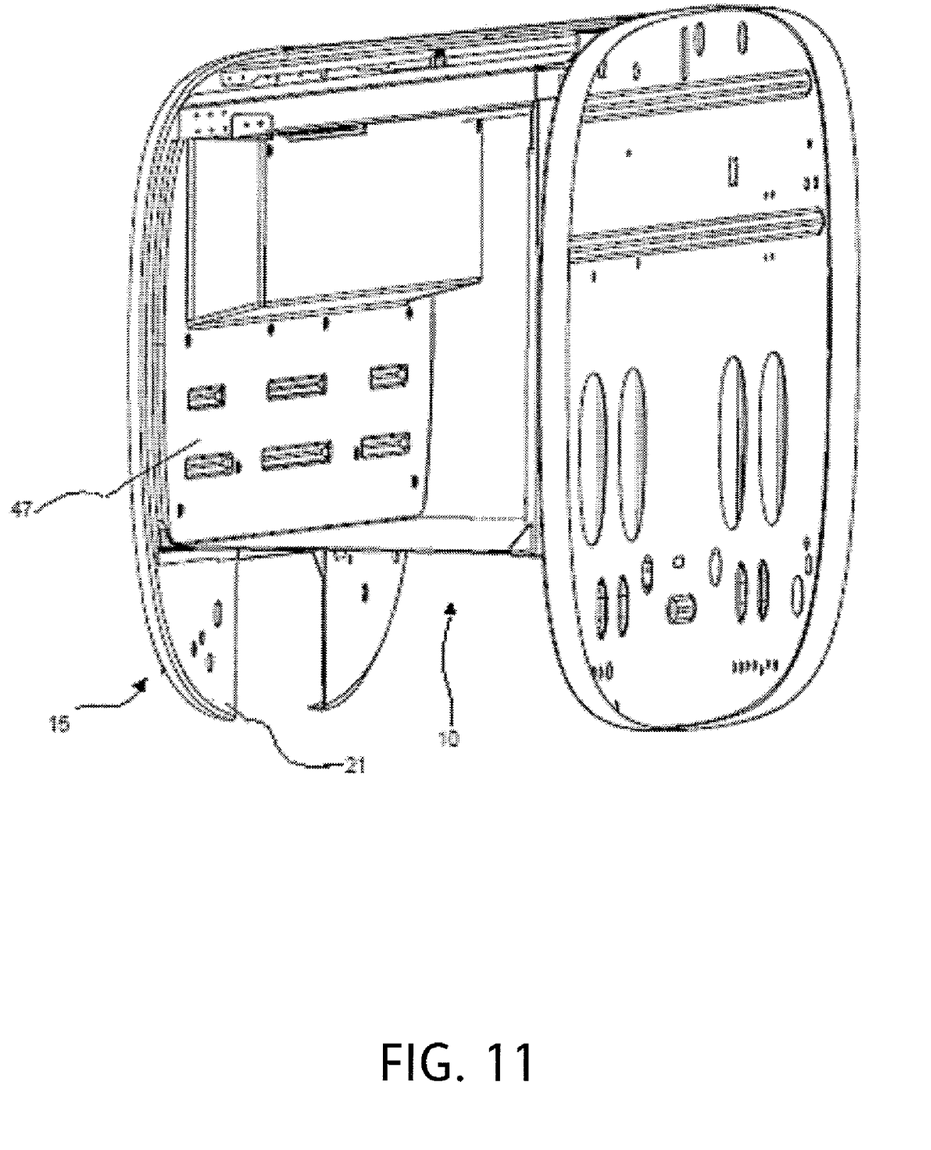
FIG. 11 is a rear perspective view of the baggage compartment showing the interior cover that protects the ECU bracket.

FIG. 9 is a front view of the washer 27, while FIG. 10 is front view of the jam nut 29. The washer 27 and the jam nut 29 are used in mounting the ECU assemblies 12 and 14 to the firewall 15 on the forward portion 18 as well as the rearward portion 21. A jam nut 29 is threaded all the way down onto each post 23 and a quad washer 27 is placed over each ECU 24 to lay on top of the jam nuts 29. Posts 23 are inserted through the firewall 15 and are accessible from the forward portion 18 of the firewall 15. A quad washer 27 is then laid over each four post configuration on the forward portion 18 side and a jam nut 29 is threaded onto each post 23, thus sandwiching firewall 15 between the two quad washers 27 and jam nuts 29. The Quad washer 27 may be made of 302-2b 1/4H stainless steel. The quad washer 27 acts as a washer for the jam nuts 29 and further assists in maintaining the firewall integrity, and when the corners of the washers 27 are bent up it locks the jam nut 29 in place. The jam nut 29 may be made of 4130N steel and zinc plated. The purpose of the nut 29 is to hold the ECU's 24 in place and to maintain the firewall 15 integrity.

Figure 12:
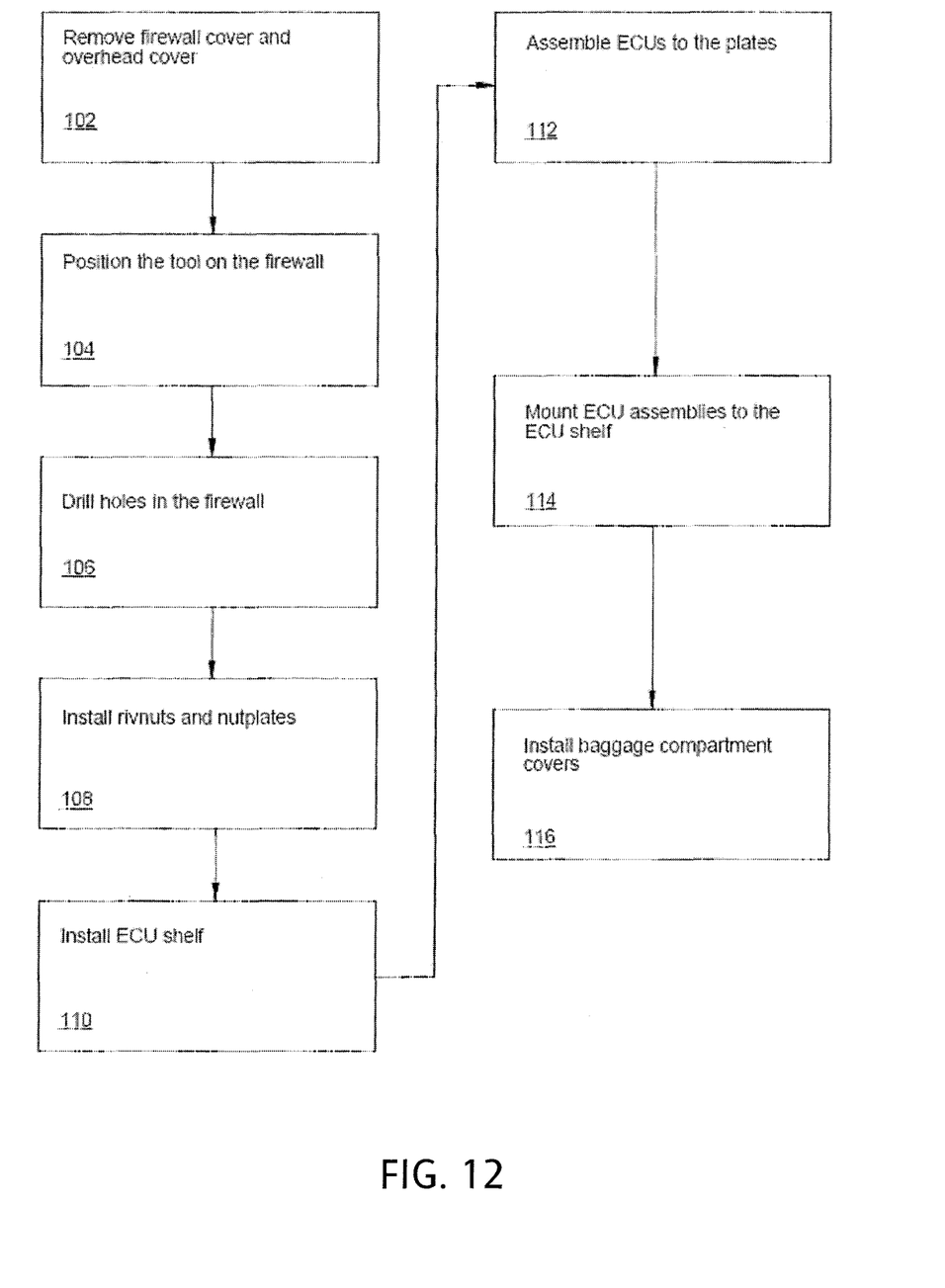
FIG. 12 is a flow chart showing the method for installation of the ECU mounting system.

FIG. 12 is a flow chart showing the method for installation of the ECU mounting system 10. The installation occurs in the following manner, in step 102, the firewall cover is removed and the overhead cover from the compartment 40 is removed. In step 104, the ECU bracket installation tool 46, is positioned on the firewall 15. In step 106, corresponding holes in the firewall 15, hat sections and longerons are drilled. In step 108, the rivnuts and nutplates are put in place. In step 110 the ECU bracket 22 is installed using hardware.

In step 112 the ECUs 24 are mounted to the dual plate 42 and single plate 43. Two ECUs 24 and four grounding straps 25 are fastened to the dual plate assembly 12 and one ECU 24 with two grounding straps 25 are fastened to the single plate assembly 14. Jam nuts 29 are threaded onto each of the twelve posts 23 of the three ECUs 24. A quad washer 27 is placed over the four posts 23 of each the ECUs 24.

In step 114, the two plate assemblies 12 and 14 are mounted onto the ECU bracket 22 with the twelve threaded posts 23 of the ECUs 24 protruding through the forward portion 18 of the firewall 15. Quad washers 27 are then placed onto each ECU 24 on the forward portion 18 of the firewall 15 and one jam nut 29 onto each post 23. The jam nuts 29 are then tightened on the forward portion 18 of the firewall 15 and the rear portion 21 side of the firewall 15 and each corner of the quad washers 27 are bent up so as to lock the jam nuts 29 in place.

In step 116, a new baggage compartment cover 47 that has been designed to cover the firewall 15 and ECU bracket 22 is installed. The upper cover and right side cover may be modified to fit the compartment 40.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An electrical control unit mounting system for use in a light aircraft comprising:
    a firewall installed in the light aircraft having a forward portion and a rearward portion, wherein the forward portion faces an engine;
    a compartment located adjacent to the rearward portion of the firewall, wherein the compartment is further located adjacent to a compartment cover;
    a plurality of holes in the firewall;
    a bracket comprising a plurality of angled brackets, wherein the bracket is mounted to the rearward portion of the firewall through the plurality of holes and located within the compartment; and
    an electrical control unit located on the bracket.

2. The system of claim 1, wherein a plurality of electrical control units are located on the bracket.

3. The system of claim 1, further comprising a central angled bracket which is smaller than the angled brackets.

4. The system of claim 1, wherein the angled brackets extend perpendicularly from the surface of the bracket.

5. The system of claim 1, wherein the bracket is secured to the firewall using a plurality of horizontally spaced screws.

6. The system of claim 5, wherein the bracket is further secured to the firewall using longerons.

7. The system of claim 1, wherein the electrical control unit further comprises four posts.

8. The system of claim 7, wherein the four posts extend through the firewall.

9. The system of claim 8, further comprising a quad washer placed over the four posts.

10. The system of claim 9, further comprising jam nuts threaded over the posts.

11. A method for mounting electronic control units in a light aircraft comprising:
    drilling holes in a firewall, wherein the firewall has a forward portion and a rearward portion, wherein the forward portion faces an engine;
    positioning an electrical control unit bracket on the rearward portion of the firewall within a compartment adjacent to the rearward portion of the firewall;
    installing an electronic control unit on the bracket and through the firewall; and
    placing a compartment cover over the ECU bracket and firewall.

12. The method of claim 11, wherein a plurality of electrical control units are installed on the bracket.

13. The method of claim 11, wherein the electrical control unit comprises angled brackets and a central angled bracket which is smaller than the angled brackets.

14. The method of claim 13, wherein the angled brackets extend perpendicularly from the surface of the bracket.

15. The method of claim 11, wherein positioning the bracket comprises securing the bracket to the firewall using a plurality of horizontally spaced screws.

16. The method of claim 15, wherein the bracket is further secured to outer longerons.

17. The method of claim 11, wherein the electrical control unit comprises four posts.

18. The method of claim 17, wherein the four posts extend through the firewall.

19. The method of claim 18, further comprising placing a quad washer placed over the four posts.

20. The method of claim 19, further comprising threading jam nuts over the posts.

* * * * *